3,196,074
PHENOTHIAZINE COMPOSITIONS AND METHOD OF PREPARING SAME
Earl Huffman, Marshalltown, Iowa, assignor to Devel, Inc., Chicago, Ill., a corporation of Illinois
No Drawing. Filed Nov. 17, 1958, Ser. No. 774,082
11 Claims. (Cl. 167—53)

This invention relates to anthelmintic, insecticide, and fungicide compositions and is more particularly directed to water soluble phenothiazine compositions and methods for their preparation.

Phenothiazine (thiodiphenylamine) is a well known anthelmintic and insecticide which is produced by reacting diarylamines together with sulfur in the presence of aluminum chloride. It is commonly used in veterinary medicine to control intestinal parasites, and is ordinarily administered orally as an aqueous dispersion, powder, tablet, capsule, or bolus. In its natural state, phenothiazine is insoluble in water and consequently has limited action on insects or parasites in the digestive tract of animals. It is generally considered that the effectiveness of a particular dosage is dependent upon the particle size of the phenothiazine, that is the finer particles being more effective therapeutically.

Those familiar with the pharmaceutical, medical, and veterinary arts are aware that, in general, a water soluble form of a medicament is more effective against organisms or infections than a completely water insoluble form. This is particularly true in the treatment of horses, cattle, sheep, swine, poultry, and other animals suffering from infection or infestation of various worms and lice. Accordingly, the art has long sought a water soluble phenothiazine while retaining its chemical effectiveness for the applications described above.

To make phenothiazine dispersible for use in drenches and for spray application to plants, various combinations of the compound have been made with long chain aliphatic alcohols, sulfated oleyl acetate, polyvinyl alcohols, alginates, sodium bicarbonate, citric acid, and the like. Admixtures of some of the above combinations have been made with various inert substances such as kieselguhr, china clay, bentonite, talc, and tripolite. These are usually employed to produce free flowing, non-agglomerating spray residues. However, such products are quite insoluble in water and have limited efficiency for use as anthelmintics, insecticides, and fungicides.

I have discovered that phenothiazine may be solubilized in compounds of the class known as polyoxyethylene ethers of mixed fatty acid esters of anhydrides of polyhydric alcohols having more than two hydroxyl groups, as well as in compounds of the class known as halogenated alkyl, alkylene or aryl quaternary ammonium compounds. Examples of the foregoing classes are polyoxyethylene sorbitan monolaurate, polyoxyethylene sorbitan monooleate, and trimethyl alkyl ammonium chloride.

I have further found that not only is the phenothiazine soluble in polyoxyethylene esters of mixed fatty acid esters of anhydrides of polyhydric alcohols having more than two hydroxyl groups, or quaternary ammonium compounds, or both, but that the resulting products are unexpectedly soluble in water in high concentration.

When quaternary ammonium compounds are used as solubilizers, the phenothiazine may be dissolved up to ten percent. The resulting composition is miscible with water in all proportions without precipitation. When it is considered that phenothiazine is shown in the chemical handbooks to be virtually insoluble in water, the practical advantage of this invention becomes at once apparent.

When the polyoxyethylene derivatives of the anhydrides of polyhydric alcohols having more than two hydroxyl groups described herein are employed as solubilizers, I have found that up to approximately four percent of phenothiazine is soluble therein. This mixture is infinitely soluble in water without precipitation of the phenothiazine.

The solubilization of the phenothiazine is effected by heating the mixture of the phenothiazine and solubilizer for a time sufficient to dissolve the phenothiazine. The time of heating is dependent upon the temperature. The lower the temperature, the longer the time, and vice versa. The temperature range has been found to be preferably within the range of 25° C. to 75° C. Some heat is required to effect solubilization. After the compositions are cooled, they are miscible with cold water in all proportions.

In another embodiment of this invention, I have found that phenothiazine may be rendered even more soluble by treating the phenothiazine dissolved in the solubilizer with an oxidizing agent. Oxidizing agents found suitable for this treatment are, for example, hydrogen peroxide, urea peroxide, metallic peroxides, oxygen, perchloric acid, and permanganates. I prefer to use hydrogen peroxide because of the absence of reaction products which might be toxic to animals when the composition is used as an anthelmintic.

I have found that by using an oxidizing agent in the presence of quaternary ammonium compound, a twenty to thirty percent solution of the phenothiazine is possible. When the polyoxyethylene ethers of mixed fatty acid esters of polyhydric alcohols are used as the solubilizing media, a ten percent solution which is stable in water may be obtained. The resulting solutions are miscible in water in infinite proportions. More concentrated solutions of the phenothiazine and solubilizer may be prepared. For example, the phenothiazine when treated with hydrogen peroxide in the presence of quaternary ammonium compound may be increased to a fifty percent concentration. This concentrated solution may be used without dilution, if so desired.

Examples of this embodiment of the invention are:

*Example I*

200 grams of phenothiazine are dissolved in 200 ml. of alkyl trimethylammonium chloride while bringing the temperature of the mixture to 25° C. 50 ml. of a 30% solution of hydrogen peroxide are added gradually with stirring. The reaction is completed when it stops foaming. The color of the reacted mixture is a deep red. Additional ammonium salt solution is added to bring the solution up to 1 liter.

*Example II*

100 grams of phenothiazine are dissolved in 200 ml. of polyoxyethylene sorbitan monolaurate while bringing the temperature of the mixture to 50° C. 50 ml. of 30% hydrogen peroxide are added gradually with stirring. When the mixture stops foaming, the reaction is completed and a deep red solution is obtained. Again, the solution is diluted with the solubilizer to one liter.

*Example III*

100 grams of phenothiazine are dissolved in 300 ml. of polyoxyethylene sorbitan monooleate while bringing the temperature of the mixture to 75° C. 50 ml. of 30% hydrogen peroxide are added gradually with stirring. When the mixture stops foaming, the reaction is completed and a deep red solution results. The solution is diluted to one liter with the solubilizer.

*Example IV*

100 grams of phenothiazine are dissolved in 200 ml. of polyoxyethylene sorbitan monooleate while raising the temperature of the mixture to 40° C. 15 ml. of 5% potassium permanganate are added gradually with stirring. When the mixture stops foaming, the reaction is complete. A deep red solution results.

Heated solutions of the above examples without the oxidizing step yield greenish brown solutions. The change in color of the solutions indicates that the phenothiazine has been oxidized, thereby improving the water solubility of the phenothiazine.

The compositions of this invention may be used for animal drenches, application in sprays for field and plant treatment, animal drinking water additives, colloid suspensions, and in numerous other ways. Since the products described herein are water soluble, I am able to apply the same directly to soybean flour and other feeds for direct ingestion by horses, cattle, swine, and other domestic animals. When the water soluble compositions are incorporated with solid feed ingredients, it is advisable to make a small dilution with water prior to admixing with the solid feed ingredients. Since the dosages are usually small, better dispersion of the composition is thereby obtained.

Animal studies show that a substantial reduction in the requisite amount of the phenothiazine for anthelmintic purposes is obtained when the water soluble product of this invention is used. That is, one-quarter to one-eighth of the dose of phenothiazine as it is currently being used will accomplish the same results, provided it has been rendered water soluble in accordance with this invention.

While in the foregoing description I have shown certain specific compositions, it will be understood that one can produce numerous similar compositions not described herein without departing from the spirit of the invention.

What I claim is:

1. An anthelmintic, insecticide, and fungicide composition which is readily soluble in water comprising phenothiazine and polyoxyethylene ether of mixed fatty acid ester of anhydride of polyhydric alcohol the phenothiazine being present in such quantity that it remains in solution when said composition is added to an aqueous medium.

2. An anthelmintic, insecticide, and fungicide composition which is readily soluble in water comprising phenothiazine and polyoxyethylene sorbitan monolaurate the phenothiazine being present in such quantity that it remains in solution when said composition is added to an aqueous medium.

3. An anthelmintic, insecticide, and fungicide composition which is readily soluble in water comprising phenothiazine and polyoxyethylene sorbitan monooleate the phenothiazine being present in such quantity that it remains in solution when said composition is added to an aqueous medium.

4. Method of preparing a water soluble phenothiazine composition comprising the steps of: admixing phenothiazine and a polyoxyethylene ether of mixed fatty acid ester of anhydride of polyhydric alcohol; heating the mixture to dissolve the phenothiazine; and cooling the mixture, the phenothiazine being present in such quantity that it remains in solution when said composition is added to an aqueous medium.

5. Method of preparing a water soluble phenothiazine composition comprising: admixing phenothiazine and polyoxyethylene sorbitan monolaurate; heating the mixture to dissolve the phenothiazine in the monolaurate; and cooling the mixture, the phenothiazine being present in such quantity that it remains in solution when said composition is added to an aqueous medium.

6. Method of preparing a water soluble phenothiazine composition comprising: admixing phenothiazine and polyoxyethylene sorbitan monooleate; heating the mixture to dissolve the phenothiazine; and cooling the mixture, the phenothiazine being present in such quantity that it remains in solution when said composition is added to an aqueous medium.

7. Method of preparing a water soluble phenothiazine composition comprising: admixing phenothiazine with a polyoxyethylene ether of mixed fatty acid esters of anhydrides of polyhydric alcohols; heating the mixture to dissolve the phenothiazine in the surfactant; adding an oxidizing agent to the heated mixture to oxidize the phenothiazine; stirring the mixture until the reaction is completed; and cooling the mixture.

8. Method according to claim 7 wherein the heating of the mixture is within the range of 25° C. to 75° C.

9. Method of preparing a water soluble phenothiazine composition comprising: admixing phenothiazine and polyoxyethylene sorbitan monolaurate; heating the mixture to dissolve the phenothiazine; adding with stirring hydrogen peroxide to the mixture and continuing the stirring until the reaction is completed; and cooling the mixture.

10. Method of preparing a water soluble phenothiazine composition comprising: admixing phenothiazine and polyoxyethylene sorbitan monooleate; heating the mixture to dissolve the phenothiazine; adding with stirring potassium permanganate to the mixture and continuing the stirring until the reaction is completed; and cooling the mixture.

11. A composition consisting essentially of phenothiazine dissolved in a polyoxyethylene sorbitan higher fatty acid ester, the phenothiazine being present in such quantity that it remains in solution when said composition is added to an aqueous medium.

References Cited by the Examiner

UNITED STATES PATENTS 2,455,054   11/48   Geiger _____ 167—53
2,815,343   12/57   Horsley _____ 260—243

JULIAN S. LEVITT, *Primary Examiner.*

MORRIS O. WOLK, WILLIAM B. KNIGHT, LEWIS GOTTS, *Examiners.*